Patented May 2, 1944

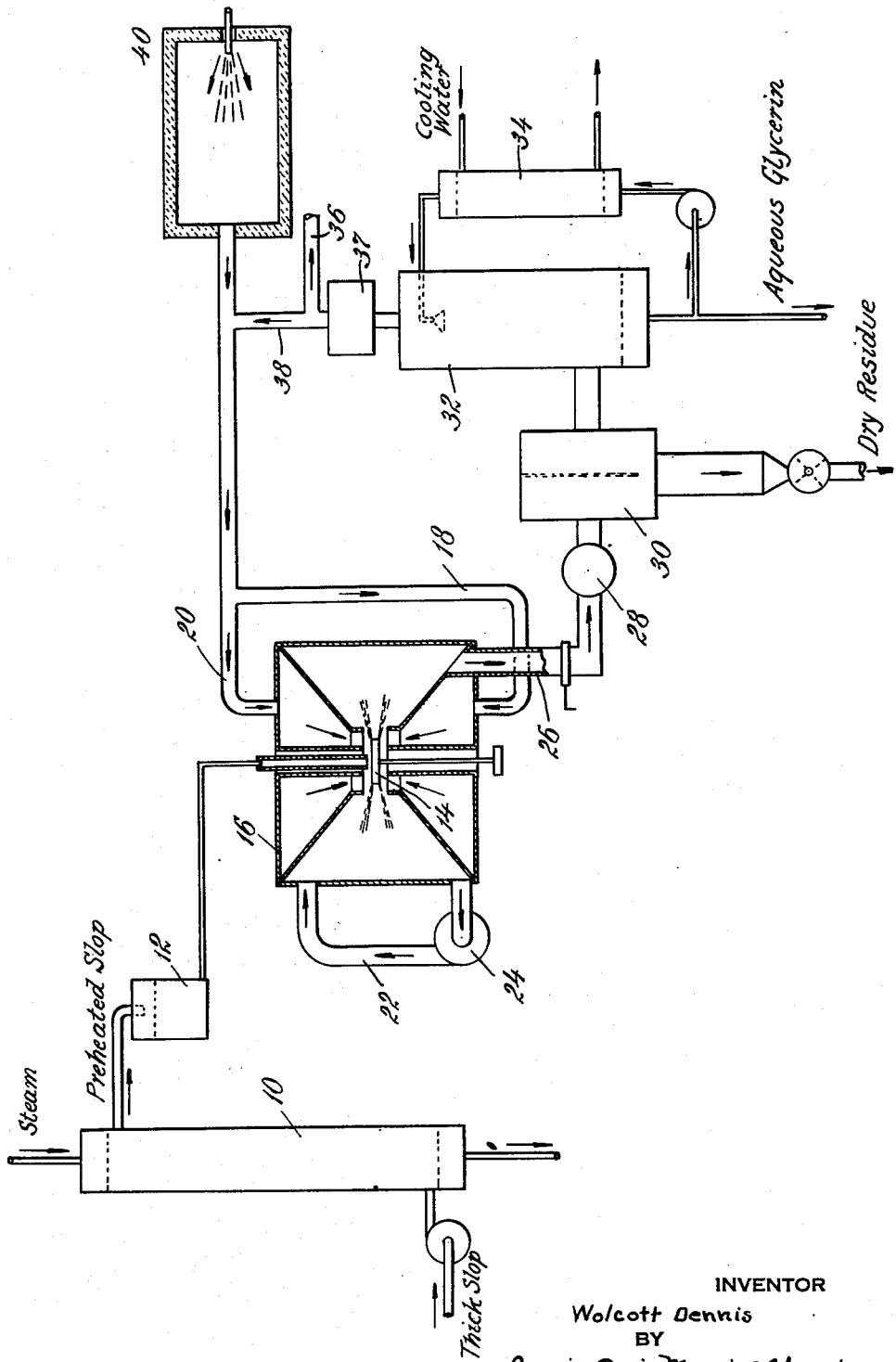

2,347,669

UNITED STATES PATENT OFFICE 2,347,669

DISTILLATION PROCESS

Wolcott Dennis, Darien, Conn., assignor, by mesne assignments, to U. S. Industrial Chemicals, Inc., a corporation of Delaware Application August 29, 1941, Serial No. 408,837

7 Claims. (Cl. 202—64)

This invention relates to improvements in the recovery of high boiling materials and a dry product representative of the solids in fermentation slops which is useful as a fertilizer, by the processing of fermentation slops of the kind containing high boiling but valuable materials such as glycerin, butylene, ethylene and propylene glycol, lactic acid, etc. Of particular importance is its application to the recovery of glycerin and a useful fertilizing material from distillery slop of the kind resulting from an ethyl alcohol-glycerin fermentation.

It is well known that the fermentation, for example, of molasses, can be carried out to produce primarily ethyl alcohol with very little glycerin. It can also be carried out to produce butyl alcohol, acetone, butylene and other glycols, lactic acid, and other products. Essentially, the present invention is directed to the recovery of valuable products from fermentation residues, and particularly from the slop resulting from a fermentation carried out to produce ethyl alcohol and glycerin. In such fermentations there is produced a fermented mash or beer containing around 3% of glycerin, 6% of alcohol and 7 to 8% of solids, the remainder being water. In the usual process, the alcohol is removed from this beer by distillation and the remainder product, called thin slop, is concentrated to a heavy liquid known as thick slop and containing up to about 15% glycerin, up to 50% solids and the remainder water.

The disposal of thick slop, whether from an ethylalcohol-glycerin fermentation or a fermentation carried out primarily to produce ethyl alcohol, has long been a difficult problem. In the past it has largely been disposed of by running it into sewage systems, but in most localities this is forbidden now. Various attempts have been made to use it as fertilizer or as feed or for other purposes, but on the whole, such attempts have not proven successful; although some slop is disposed of in this manner. Also, various attempts have been made to recover the glycerin present, particularly in the slop from an alcohol-glycerin fermentation, but these proposals have not been successful, usually because of excessive cost per unit of glycerin recovered and the unsatisfactory nature of the residue obtained.

In accordance with the present invention, the high boiling material, e. g., glycerin, is recovered from the concentrated slop and the solids in the slop are obtained as a dry, non-hygroscopic, odorless powder by atomizing the thick slop into a current of hot inert gas or vapor at a sufficiently high temperature to vaporize and carry from the distillation zone in vapor form substantially all of the water and glycerin which the slop contains and also to subject the solids to a temperature sufficiently high to cause a limited decomposition with the evolution of some oxides of carbon but without serious loss of nitrogen. This limited decomposition results in the irreversible dehydration of the solids, and the solids, on cooling, are in the form of a powder composed for the most part of relatively hard, non-hygroscopic, discrete particles which will not reabsorb water from the air even under the conditions of widely fluctuating relative humidity. In this operation, the thick slop is sprayed or atomized into the stream of hot inert gas at or about the point of introduction of the gas into the distillation chamber, so that the aqueous liquid comes into contact with the hottest portion of the gas, with resulting extremely rapid vaporization of the water and glycerin and simultaneous cooling of the hot gases to the point where they do not cause undue decomposition either of the glycerin or the residue. This operation may be referred to as a co-current spray drying, as the course of the drying gas and the slop through the chamber are the same. Usually both the dry residue and the vapors and gases leave the chamber through the same conduit, but with some types of apparatus, part or all of the solids may be separately removed—e. g., part or all of the solids may be collected in the bottom of the spray tower and removed therefrom by one of the known types of devices while the gases and vapors are separately removed through a conduit. It is essential, for successfully carrying out this operation, that the inert gas used to supply the heat required for vaporizing the water and glycerin be supplied at a sufficiently high temperature and in sufficient quantity to insure, not only the extremely rapid evaporation of the water and glycerin, but also the production of a thoroughly dried residue sufficiently decomposed to be non-hygroscopic. The minimum temperature for the feed gas is about 900° F., and at such temperatures, quite a large volume of gas is required per unit of thick slop treated. Better results are usually obtained with the use of gas or vapor at a temperature of from 1100 to 1500° F., and even higher temperatures may be used successfully. The quantity of gas used per unit of thick slop treated will vary, depending upon its temperature and the water and glycerin content of the slop, but must be such that the temperature of the exit gases and vapors from the distilling chamber is high enough to prevent condensation of the glycerin (or, in the case of other types of fermentation, other high boiling material such as lactic acid or one of the glycols). Where the operation is carried out to recover glycerin, this temperature will be at least 375° F. and best results are obtained when this temperature is around 480 to 525° F. Where glycols are recovered, this temperature may be lower, as the condensation temperatures for the lower glycols are lower than those of glycerin. The exit temperature may be even higher than 525° F. but it is usually uneconomical to maintain such high exit temperatures.

The exit gases include water vapor, the vapors of the high boiling material, e. g., glycerin vapor, the heating gas and whatever gaseous products of decomposition, which are relatively small in amount, are formed, and usually carry the dry residue. While still maintained at a sufficiently high temperature to prevent condensation, these gases are passed through a dust separator for the separation of the dry residue, which is recovered as a non-hygroscopic powder suitable for use as fertilizer. The remaining gases and vapors are then cooled and treated to recover the glycerin therefrom.

Various inert gases or vapors may be used as the heating or carrier gas, including superheated steam, nitrogen, carbon dioxide, etc., but for reasons of cost, the operation will ordinarily be carried out with furnace gases resulting from the burning of fuel, e. g., gas or oil, with an amount of air calculated to give combustion gases containing very little, if any, oxygen. Oxygen in the heating gas is objectionable both because of its effect on the glycerin and because of the hazard resulting from the suspension of the large quantity of solids in finely divided form in a gas stream containing any substantial amount of oxygen at the extremely high temperatures necessarily used in the operation. As the combustion gases from an oil or gas burner are considerably hotter than can be used, they are advantageously tempered by recycling a portion of the exit gases after removal of the glycerin therefrom and the cooling incidental to such removal. The proportion of the exit gases so recycled is calculated to maintain a substantially constant flow of heated gas at the required temperature to the distilling chamber, an amount equivalent to the furnace combustion gases and any fixed or uncondensed gases or vapors evolved in the distillation being purged.

The operation is advantageously carried out at atmospheric pressure, as quite complete recovery of the glycerin can be obtained under these conditions and as the residue produced under these conditions is very satisfactory, but higher or lower pressures may be used. Operation at atmospheric pressure avoids both the expense and hazard involved in operating under vacuum, as the special and large equipment required for vacuum operation is not necessary and as there is no danger of explosions due to air leaks into the system.

The invention will be further described in connection with the accompanying drawing which illustrates diagrammatically apparatus which may be used for carrying out the invention. The spray drying or distilling apparatus illustrated is that sold by the Western Precipitation Corporation under the trade name of Turbulaire spray dryer. Other types of concurrent spray drying apparatus, including types provided with pressure nozzles or other devices for spraying, may be used.

In the apparatus illustrated, the thick slop is supplied to the preheater 10, in which its temperature is raised to around 200° F. by indirect heating with steam or in other suitable manner. It is then supplied to the feed tank 12 which, by gravity feed, supplies the preheated slop to the rapidly rotating atomizing disc 14 positioned within the distilling chamber 16. Atomizers of this type are well known and need not be described here, their size, operating speed, etc., being controlled to give the necessary fine spray for the particular feed. Hot combustion gases, produced and tempered as hereafter described, are introduced into the distilling chamber close to the spray head 14 through the conduits 18 and 20, the direction of flow being such as to cause the gases to follow a spiral path through the chamber, the atomized liquid being thrown directly into the path of the extremely hot entrance gases. The gases, vapors and suspended matter are, to a considerable extent, carried through the duct 22 and the fan 24, to recirculate them and increase the time of suspension of the atomized material in the hot gases. The gases and suspended matter are drawn off from the chamber through the conduit 26 by the pump 28, and in the dust separator 30, the suspended solids are removed from the stream of gas. This dust separator may be of any suitable type, such as one or more cyclone separators or other suitable device capable of effectively removing the powder without unduly interfering with the flow of gas. The conduit 26 and the separator 30 must, of course, be efficiently insulated to prevent any substantial drop in temperature of the gases which might result in precipitation of glycerin. After removal of the suspended solids, the hot gases are passed through a spray tower 32 in which much of the glycerin is washed out with cold water, which may be recirculated, to build up the concentration of the glycerin solution obtained, through the cooler 34. From the spray tower 32 the gases are passed through a device 37 to precipitate entrained glycerin, which may be present in the form of a very persistent fog, not removable by passing the gases through a packed tower or by other ordinary means. An electric precipitator may, for example, be used for this purpose although other devices, designed to remove entrained materials, may be used if satisfactory. After substantially complete removal of glycerin, a portion of the gas is purged from the system through the line 36 while the remainder is fed through the line 38 and recycled. Hot, inert gases are supplied by the oil burner 40, operated so that the combustion gases contain substantially no free oxygen and are sufficient in amount to supply, after admixture with the recirculated gas, the necessary quantity of hot gas at the selected temperature. The quantity of gas purged through the line 36 is equivalent to the amount of combustion gases produced plus any fixed gases and uncondensed vapors resulting from the distillation operation. As the dry residue is separated from the gases and vapors while still very hot, i. e., at a temperature above 375° F., it will usually be necessary to cool it before packing or exposing it to the air too freely. This may be accomplished in various ways. One method is to feed the discharge from the separator 30 into a current of cool gas, for example, some or all of the gas discharged through the conduit 36, and pass the resulting cooled suspension through another cyclone or other type of separator from which the solids may be removed for any desired use.

For a typical operation for the treatment of a slop containing about 15% glycerin and 50% solids, the drying chamber may be about 12 feet in diameter and 8 feet high, with the atomizer, pumps, etc. of suitable capacity for the treatment of about 3000 pounds of slop per hour. The hot gases may be introduced at a temperature of about 1200° F. in sufficient quantity to maintain the exit temperature at 480° F., the feed being preheated to 200° F. Around 4 to 5 pounds of the tempered combustion gases will be required for each pound of feed, and the quantity of the combustion gases can readily be calculated when the temperature of the recycled gas and the temperature of the combustion gases are known. This will depend upon operating conditions, furnace design, etc., and cannot well be specified. Under such conditions, nearly all of the glycerin in the slop will be recovered, and the solid residue will be obtained as a dry, non-hygroscopic odorless powder having distinct value as a source of nitrogen, potash and certain growth factors for fertilizing purposes. It is one of the important advantages of the present invention that the residue is in the form of a non-hygroscopic powder, as in prior processes which have been proposed for the treatment of distillery slops of any kind, the residues have been obtained either as viscous or sticky products or as extremely hygroscopic dry products which are exceedingly difficult to handle, and usually worthless because of this, unless they contain some added agent to control or lessen their hygroscopicity.

While the invention has been described with particular reference to the recovery of glycerin from distillery slop resulting from an alcohol-glycerin fermentation, and while it has important advantages for the treatment of this particular slop, it may also be applied to the recovery of such other materials as glycols or lactic acid or other substances so difficultly volatile as to make their recovery from fermentation residues by ordinary distillation impractical.

I claim:

1. The process of recovering from distillers' slop a dry product in the form of discrete particles capable of retaining their original form upon exposure to atmospheric humidity which comprises spraying the fermentation residue into a stream of inert gas at a temperature not substantially lower than 900° F. but insufficient to char or coke the resultant particles to any substantial extent, and separating the dry product from the gas stream while the temperature is above the point at which condensation of volatile products therein can occur.

2. The process of recovering from distillers' slop a dry product in the form of discrete particles capable of retaining their original form upon exposure to atmospheric humidity which comprises spraying the fermentation residue into a stream of inert gas at a temperature not substantially lower than 900° F. but insufficient to char or coke the resultant particles to any substantial extent, separating the dry product from the gas stream while the temperature is above the point at which condensation of volatile products therein can occur, and subsequently recovering such volatile products by cooling the gas stream.

3. The process of recovering from glycerin-containing distillers' slop a dry product in the form of discrete particles capable of retaining their original form upon exposure to atmospheric humidity which comprises spraying the residue into a stream of inert gas at a temperature of at least 900° F. but insufficient to char or coke the resultant particles to any substantial extent, and separating the solids as a dry residue from the gas stream while maintaining the temperature sufficiently high to prevent condensation of glycerin.

4. The process of recovering from glycerin-containing distillers' slop a dry product in the form of discrete particles capable of retaining their original form upon exposure to atmospheric humidity which comprises spraying the residue into a stream of inert gas at a temperature of at least 900° F. but insufficient to char or coke the resultant particles to any substantial extent, separating the solids as a dry residue from the gas stream while maintaining the temperature sufficiently high to prevent condensation of glycerin, and thereafter recovering the glycerin by cooling the gas stream.

5. The process of recovering from glycerin-containing distillers' slop a dry product in the form of discrete particles capable of retaining their original form upon exposure to atmospheric humidity which comprises spraying the slop into a stream of inert gas at a temperature between 1100° F. and 1500° F., separating the solids as a dry residue from the gas stream while maintaining the temperature thereof above the point at which condensation of the glycerin can occur, and thereafter recovering the glycerin by cooling the gas stream.

6. The process of recovering from distillers' slop a dry product in the form of discrete particles capable of retaining their original form upon exposure to atmospheric humidity which comprises spraying the residue into a stream of inert gas at a temperature of at least 900° F. but insufficient to char or coke the resultant particles to any substantial extent, withdrawing the gas stream including vapors and solids, separating the solids as a dry residue from the gas stream while the temperature thereof is above the point at which condensation of vapors can occur, cooling the gas stream to separate the high boiling material therefrom, admixing a portion of the resulting cool gas with hot combustion gases resulting from the combustion of a fuel with a limited amount of air such that the combustion gases contain substantially no oxygen, the proportion of the cool gas to combustion gas being such that the temperature of the combined stream is at least 900° F., and using the resulting combined stream as the hot gas into which the fermentation residue is sprayed.

7. The process of recovering from glycerin-containing distillers' slop a dry product in the form of discrete particles capable of retaining their original form upon exposure to atmospheric humidity which comprises spraying the residue into a stream of inert gas at a temperature of at least 900° F. but insufficient to char or coke the resultant particles to any substantial extent, withdrawing the gas stream including vapors and solids, separating the solids as a dry residue from the gas stream while the temperature thereof is above the point at which condensation of glycerin can occur, cooling the gas stream to separate glycerin, admixing a portion of the resulting cool gas with hot combustion gases resulting from the combustion of a fuel with a limited amount of air such that the combustion gases contain substantially no oxygen, the proportion of the cool gas to combustion gas being such that the temperature of the combined stream is at least 900° F., and using the resulting combined stream as the hot gas into which the fermentation residue is sprayed.

WOLCOTT DENNIS.